United States Patent [19]

Nakata et al.

[11] Patent Number: 4,798,260
[45] Date of Patent: Jan. 17, 1989

[54] STEERING APPARATUS FOR A FRONT WHEEL DRIVE TRACTOR

[75] Inventors: Masaru Nakata, Sakai; Yuichi Kitao, Ashiya, both of Japan

[73] Assignee: Kubota, Ltd., Osaka, Japan

[21] Appl. No.: 928,124

[22] Filed: Nov. 7, 1986

[30] Foreign Application Priority Data

Mar. 27, 1986 [JP] Japan ................................. 61-70301
Apr. 4, 1986 [JP] Japan ................................. 61-78970

[51] Int. Cl.4 ............................................ B60K 17/30
[52] U.S. Cl. ...................................... 180/253; 74/391; 74/424; 180/255
[58] Field of Search ............... 180/252, 253, 254, 255, 180/263, 248; 74/750 R, 757, 391, 420, 423, 424

[56] References Cited

U.S. PATENT DOCUMENTS 4,516,654  5/1985  Nishihara ............................ 180/255

FOREIGN PATENT DOCUMENTS 63524    4/1983  Japan ................................. 180/248
180323  10/1983  Japan ................................. 74/391
206420  12/1983  Japan ................................. 180/252
154915   8/1985  Japan ................................. 180/253
2128948  5/1984  United Kingdom .................. 180/253

Primary Examiner—David M. Mitchell
Assistant Examiner—Everett G. Diederiks, Jr.
Attorney, Agent, or Firm—Edwin E. Greigg

[57] ABSTRACT

A steering apparatus for a front wheel drive tractor comprising, at each of opposite lateral sides thereof, a front axle, a front axle case housing the front axle, a kingpin, a transmission case provided in an outer end region of the front axle case to be pivotable about the kingpin, and a front wheel attached to the transmission case and including a hub shaft. The kingpin is operatively connected to the front axle through a bevel gear transmission, and the hub shaft is operatively connected to the kingpin through a bevel gear transmission and a planetary reduction mechanism. The front wheel has a substantially zero camber angle, and the kingpin is inclined such that a lower portion of the transmission case disposed inwardly with respect to a center of the tractor is substantially contained inside a rim of the front wheel.

11 Claims, 6 Drawing Sheets

STEERING APPARATUS FOR A FRONT WHEEL DRIVE TRACTOR

BACKGROUND OF THE INVENTION (1) Field of the Invention

The present invention relates to a steering apparatus for a front wheel drive tractor, and more particularly to a steering apparatus including a transmission structure between a front axle and a front wheel hub shaft.

(2) Description of the Prior Art

A known front wheel drive tractor comprises front wheels disposed at opposite ends of a front axle case and steerable about kingpins through transmission cases. Each of the transmission cases is disposed inside a rim of the front wheel, and contains a transmission operatively connecting the front axle to the front wheel.

Front wheels of an ordinary passenger car have a camber angle of about 2° to prevent shimmy during a high speed run. The front wheels of the known tractor noted above also have a camber angle of about 2° although the tractor does not run at high speed unlike a passenger car.

Soft tyres are used on wheels of the ordinary passenger car. Therefore, the inclination of the front wheels with upper portions thereof disposed laterally outwardly as noted above does not result in partial wear of front wheel tyres, i.e. wear that is more conspicuous in laterally outward portions than in other portions of the tyres. However, the tractor uses hard tyres, and the front wheel inclination noted above presents the problem of conspicuous partial wear occurring to laterally outward portions of the front wheel tyres.

In order to prevent the partial wear of the front wheel tyres of the tractor, it is conceivable to eliminate the camber angle of the front wheels since the tractor does not run at high speed as does the ordinary passenger vehicle. However, such a modification alone would result in the lower portions of the right and left transmission cases greatly projecting from inside the front wheels, and in a corresponding reduction of spaces below the transmission cases. This would give rise to the problem that the tractor is not fit for an agricultural operation to be carried out while straddling a large ridge.

SUMMARY OF THE INVENTION

The object of the present invention is to provide a steering apparatus for a tractor that eliminates the disadvantage of the known tractor noted above.

In order to achieve this object, a steering apparatus for a front wheel drive tractor comprising, at each of opposite lateral sides thereof, a first front axle, a front axle case housing the first front axle, a kingpin, a transmission case provided in an outer end region of the front axle case to be pivotable about the kingpin, a front wheel attached to the transmission case and including a second front axle, a first transmnission operatively connecting the kingpin to the first front axle, and a second transmission operatively connecting the second front axle to the kingpin, wherein the front wheel has a substantially zero camber angle, and the kingpin is inclined such that a lower portion of the transmission case disposed inwardly with respect to a center of the tractor is substantially contained inside a rim of the front wheel.

Since in the above construction the front wheels have substantially no camber angle, there occurs no partial wear of front wheel tyres even if the tyres are hard. Unlike an ordinary passenger car, the tractor does not run at high speed. Therefore, the problem of stability in high speed running such as shimmy hardly comes into question, and the front wheels having no camber angle is not very detrimental to the running performance. Furthermore, since the kingpin angle has such a degree as to permit the lower inner portions of the transmission cases to fit inside the front wheels, a space not smaller than in the prior art is provided below the transmission cases although the camber angle is made zero. This permits the tractor to engage in an agricultural operation while straddling a large ridge, which would be impossible if the transmission cases contacted the ridge.

According to a preferred embodiment of the invention, a reduction mechanism for driving each front wheel is devised to be compact in the transverse direction of the tractor. This construction is effective to increase a mounting space for the lower portion of the transmission case.

Other and further objects of this invention will become obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

The drawings illustrate an embodiment of the present invention, in which.

DESCRIPTION OF THE PREFERRED EMBODIMENT

The present invention as applied to a four wheel drive tractor will be described hereinafter with reference to the accompanying drawings.

Figure 1:
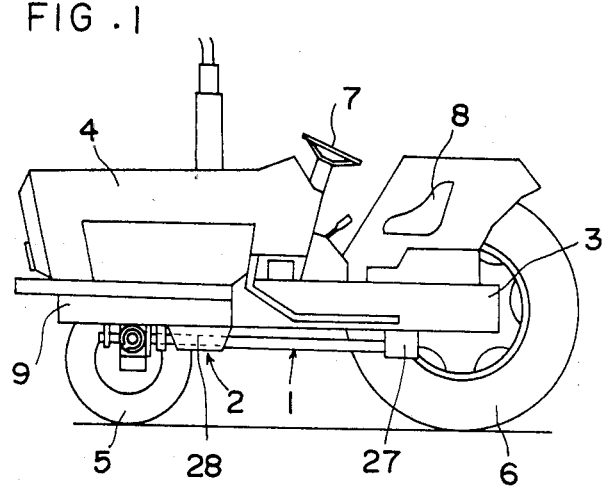
FIG. 1 is a side elevation of a tractor.

Referring to FIG. 1, the tractor comprises a frame 1 including an engine 2 and a transmission case 3. Number 4 denotes a hood covering the engine 2. Number 5 denotes steerable front wheels, number 6 denotes rear wheels, number 7 denotes a steering wheel, and number 8 denotes a driver's seat. A front wheel support 9 extends forwardly from the engine 2 as also shown in FIGS. 2 and 4.

Figure 2:
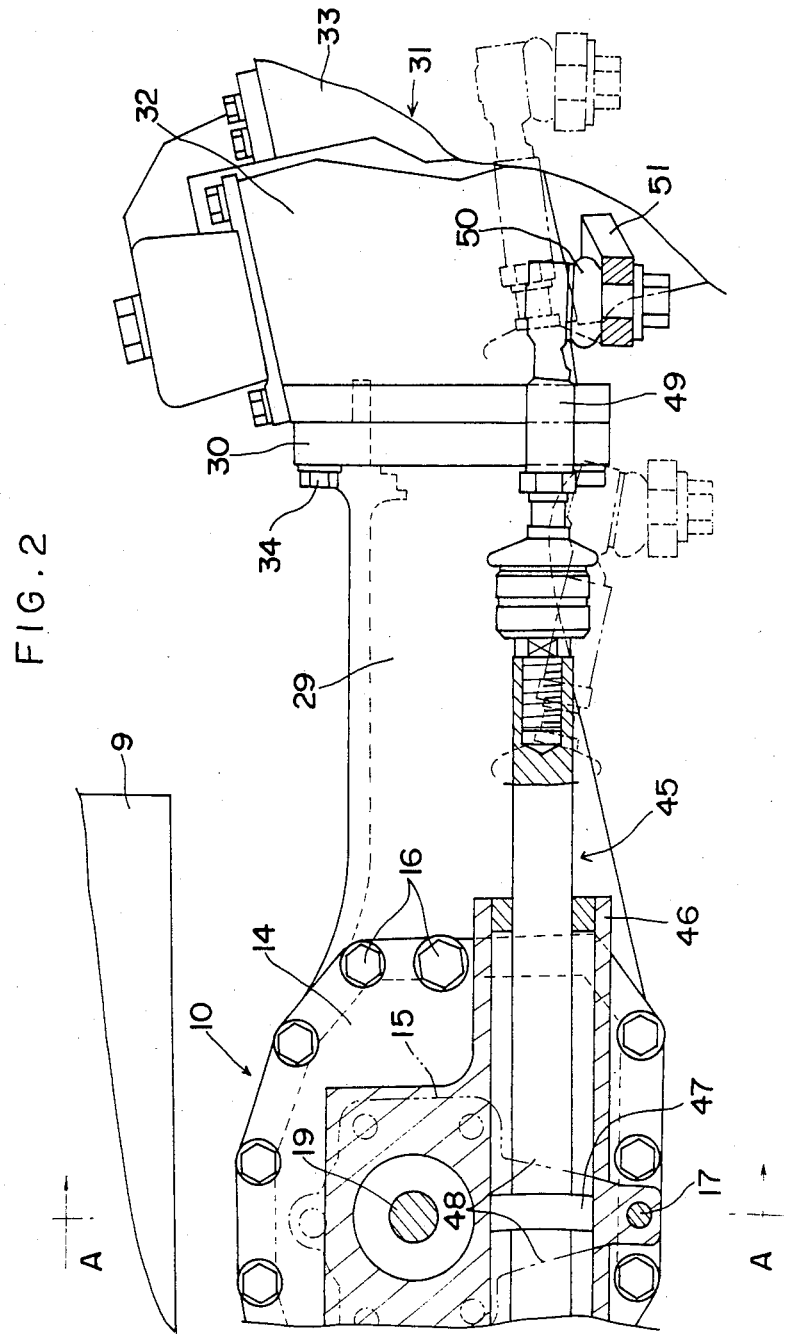
FIG. 2 is a rear view of a front axle case and adjacent elements.
Figure 3:
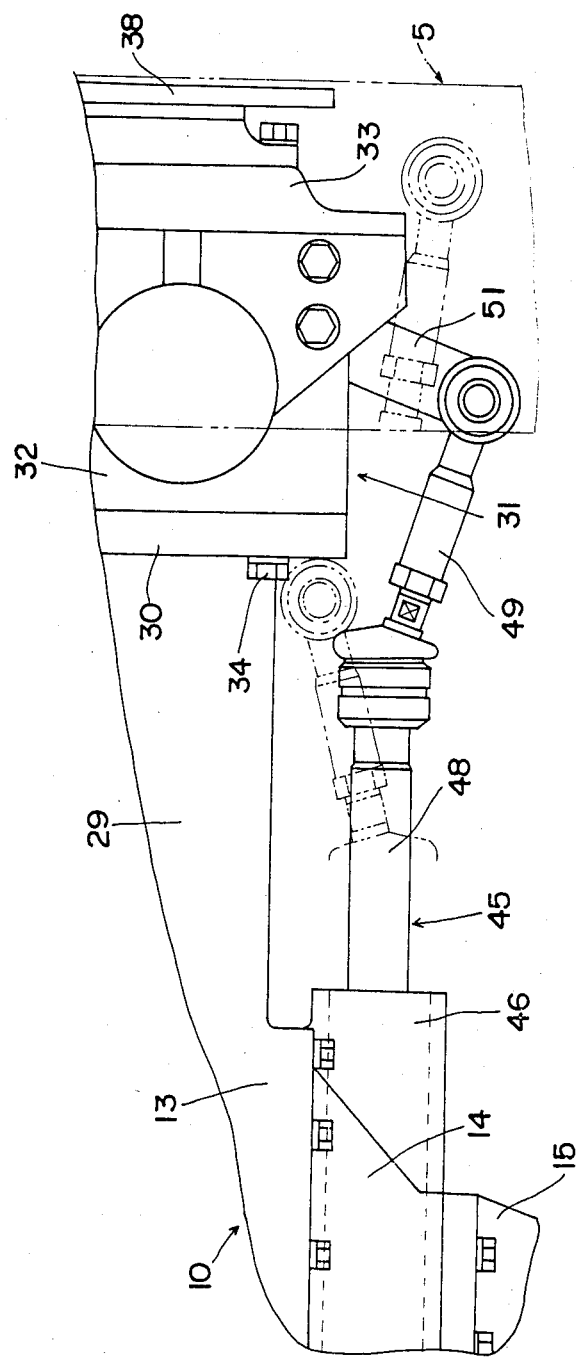
FIG. 3 is a plan view of the front axle case and adjacent elements.
Figure 4:
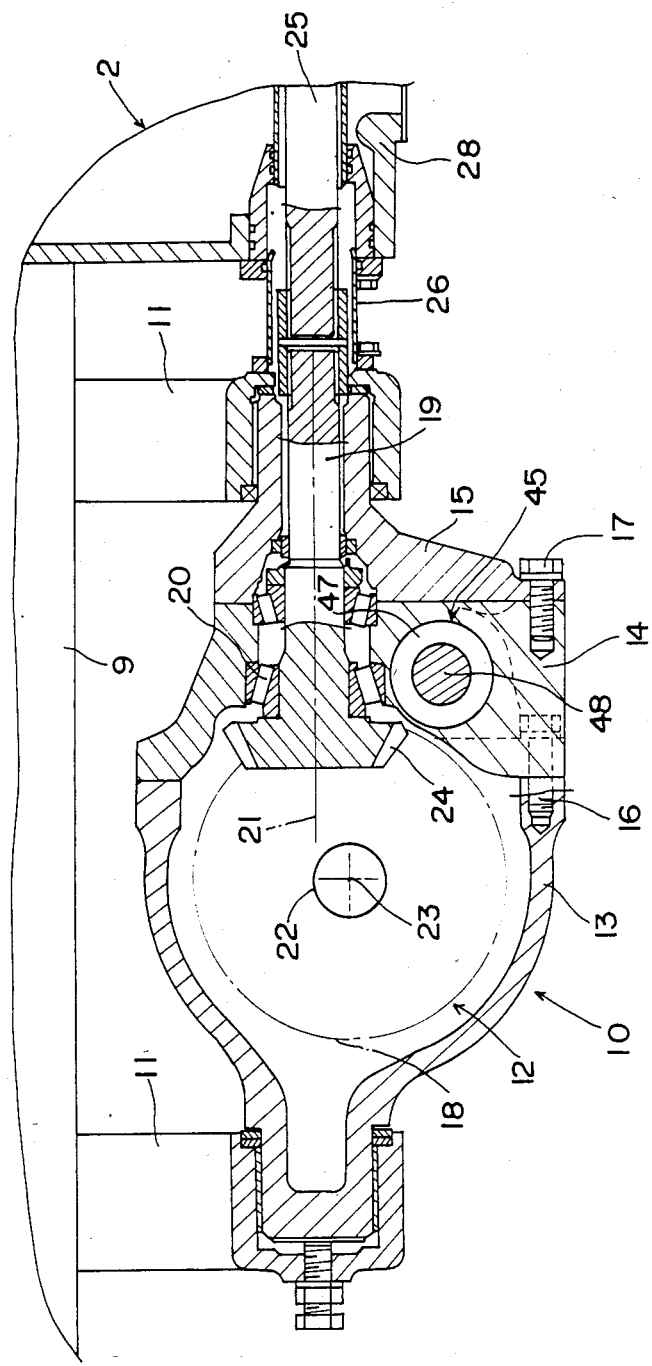
FIG. 4 is a section taken on line A-A of FIG. 2.

Referring to FIGS. 2 through 4, number 10 denotes a front wheel differential case disposed below the front wheel support 9, and is supported by the front wheel support 9 through a pair of front and rear mounting members 11 to be oscillatable about an axis extending longitudinally of the tractor. The front wheel differential case 10 contains a front wheel differential 12. As best shown in FIG. 4, the front wheel differential case 10 comprises a main differential case member 13, a gearing case 14 and a bearing cover 15 arranged in the mentioned order from front to rear. The main differential case member 13 and bearing case 14 are rigidly and detachably interconnected by bolts 16, and the bearing case 14 and bearing cover 15 are rigidly and detachably interconnected by bolts 17. The main differential case member 13 opens rearwardly and substantially contains and rotatably supports a differential bevel gear 18 of the front wheel differential 12.

The bearing case 14 rotatably supports a differential drive shaft 19 through a bearing 20. The differential drive shaft 19 has an axis 21 located above an axis 23 of front wheel axles 22 extending rightward and leftward from the front wheel differential 12. The differential drive shaft 19 defines a differential bevel pinion 24 integral with a forward end thereof and in mesh with the differential bevel gear 18. The bevel gear 18 and bevel pinion 24 are the hypoid gear type.

The differential drive shaft 19 extends rearwardly through the bearing cover 15 for operative connection with a propeller shaft 25 by means of a coupling 26. The propeller shaft 25 extends forwardly from a power takeoff device 27 attached to the bottom of transmission case 3, and penetrates an oilpan 28 under the engine 2.

Number 29 denotes a pair of right and left front axles cases which are formed integral with the main differential case member 13 and extends rightward and leftward therefrom, respectively, and in which the front axles 22 are rotatably mounted. Each of the front axle cases 29 includes a coupling flange 30 formed integral with an outer end thereof.

Figure 5:
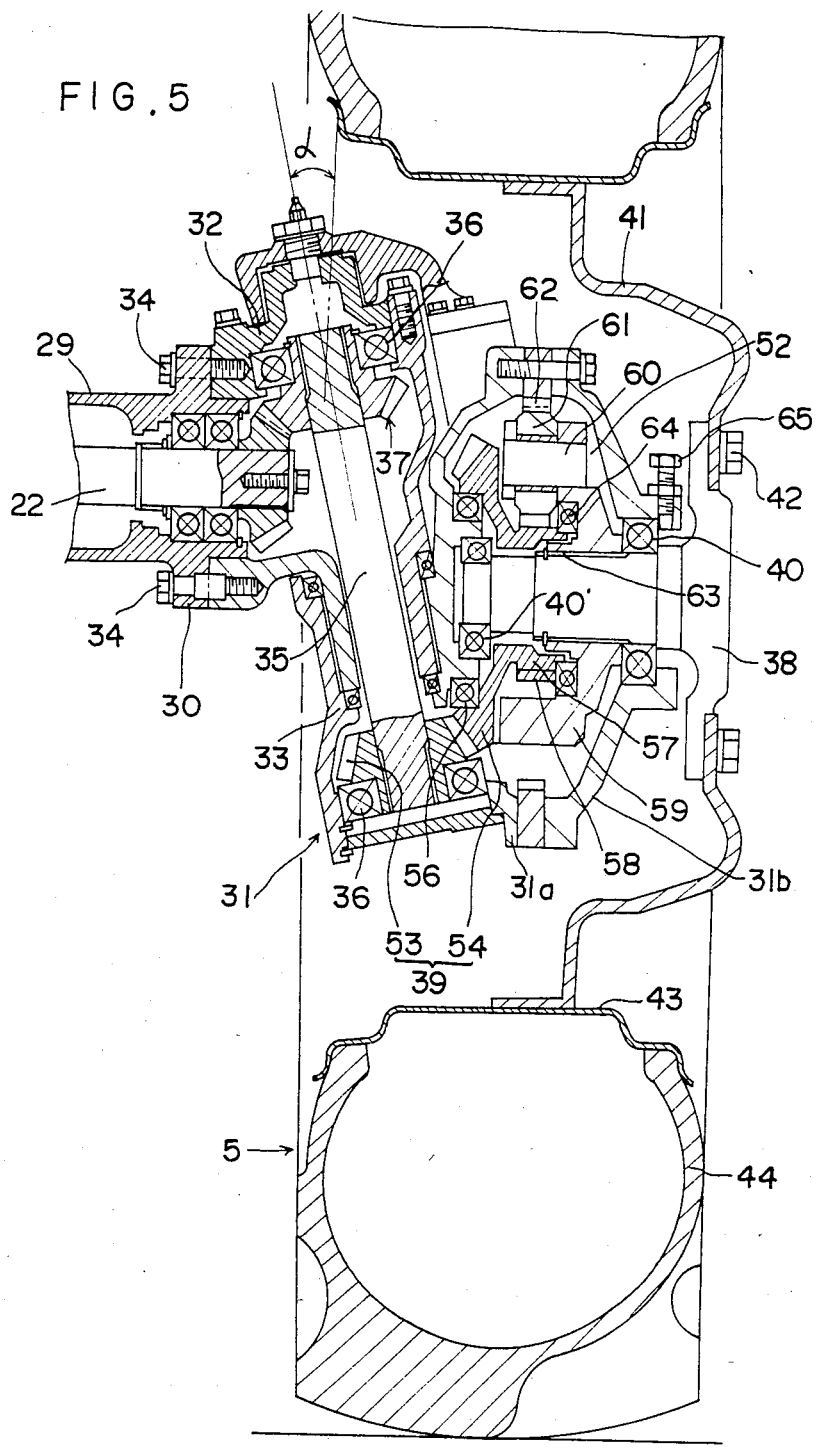
FIG. 5 is a rear view in section of a transmission for driving a front wheel.
Figure 7:
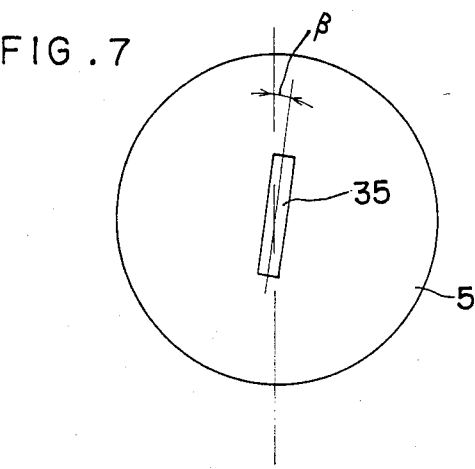
FIG. 7 is a schematic side view showing a positional relationship between a kingpin and the front wheel.

Number 31 denotes a pair of right and left transmission cases. As shown in FIG. 5, each transmission case 31 comprises a stationary case 32 and a movable case 33. The stationary case 32 is secured by means of bolts 34 to the coupling flange 30 of the front axle case 29. The movable case 33 is pivotable about a kingpin 35 relative to the stationary case 32. The kingpin 35 is rotatably supported by the cases 32, 33 through bearings 36, with such an inclination that the upper end thereof is located more inwardly of the tractor than the lower end as seen in FIG. 5. The kingpin 35 is also inclined rearwardly as illustrated in FIG. 7. The kingpin 35 is operatively connected to the front axle 22 through a bevel gear transmission 37 and to a front wheel hub shaft 38 through a bevel gear transmission 39.

The front wheel hub shaft 38 is rotatably supported by the movable case 33 through bearings 40, 40'. A disc 41 of the front wheel 5 is secured to the hub shaft 38 by means of bolts 42, and an annular rim 43 is secured to the disc 41. Number 44 denotes a tyre having a lug and fitted peripherally of the rim 43. Most of the transmission case 31 is disposed inside the rim 43 of the front wheel 5.

The front wheels 5 have zero camber angle and a kingpin angle $\alpha$ is 12° which is greater than the conventional angle of 7.5°, to permit a lower portion of the transmission case 31 to fit inside each front wheel 5.

Figure 8:
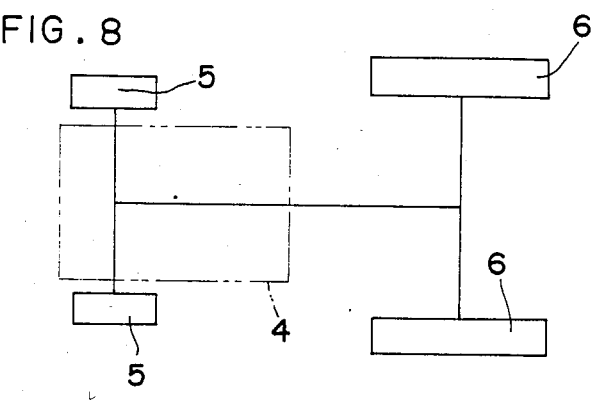
FIGS. 8 and 9 are schematic plan view showing different positions of front wheels.

Furthermore, the front wheels 5 have a 5° caster angle $\beta$ which is greater than the conventional angle of 2°. As also shown in FIG. 8, the front wheels 5 have no toe-in.

In FIGS. 2 through 4, number 45 denotes a front wheel steering power cylinder extending transversely along a position behind and close to the front axle case 29. The power cylinder 45 comprises a hollow tube 46, a piston 47 and a pair of right and left piston rods 48. The hollow tube 46 is formed integral with the bearing case 14 at a position below the differential drive shaft 19, and extends rightward and leftward from the bearing case 14. Each of the piston rods 48 extends rightward or leftward from the hollow tube 46 to be connected to a steering arm 51 through a connecting rod 49 and a ball joint 50. The steering arm 51 is secured to the movable case 33.

Figure 6:
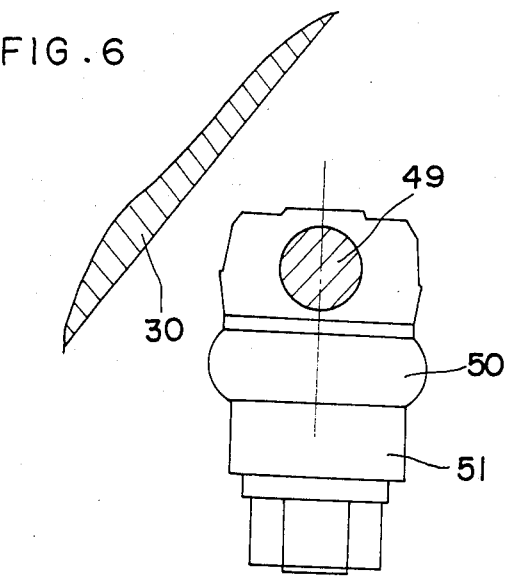
FIG. 6 is a fragmentary view partly in section showing a positional relationship between a coupling flange and an outer end of a connecting rod.

The coupling flange 30 of the front axle case 29 and the coupling portion of the stationary case 32 attached to the coupling flange 30 having a polygonal, circular or other shape. As shown in FIG. 6, the coupling flange 30 and the coupling portion are cut out at a lower rear position to define an inclined, rearwardly rising undersurface in order that the coupling flange 30 and the coupling portion do not interfere with an outer end of the connecting rod 49 or the ball joint 50 with the front wheels 5 are steered.

According to the described embodiment, the steering wheel 7 is turned to actuate a hydraulic control valve to supply pressure oil to the power cylinder 45. Then the piston 47 and piston rods 48 move rightward or leftward and, through the connecting rod 49, ball joint 50 and steering arm 51, cause the movable case 33 to pivot about the kingpin 35 thereby steering each front wheel 5.

Since in the above embodiment the front wheels 5 have no camber angle and no toe-in, there occurs no partial wear of the front wheel tyres 44 even if the tyres 44 are hard.

Unlike an ordinary passenger car, the tractor does not run at high speed. Therefore, the problem of stability in high speed running such as shimmy hardly comes into question, and the front wheels 5 having no camber angle is not very detrimental to running performance.

Furthermore, since the kingpin angle $\alpha$ has such a degree as to permit the lower inner portions of the transmission cases 31 to fit inside the front wheels 5, a space not smaller than in the prior art is provided below the transmission cases 31 although the camber angle is made zero. This permits the tractor to engage in an agricultural operation while straddling a large ridge, which would be impossible if the transmission cases 31 contacted the ridge.

As shown in FIGS. 2 and 3, the outer end of connecting rod 49 and the ball joint 50 swing about the kingpin 35 when the front wheels are steered. Since the kingpin angle $\alpha$ and caster angle angle $\beta$ are greater than in the prior art, the outer end of connecting rod 49 and the ball joint 50 swing downwardly to a position below the coupling flange 30 of the front axle case 29 as they move inwardly of the tractor.

Figure 9:
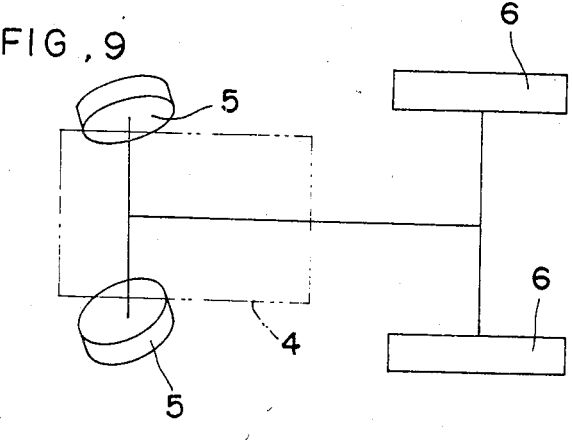

Furthermore, as shown in FIG. 9, since the kingpin angle $\alpha$ and caster angle $\beta$ are greater than in the prior art as noted above, the front wheels 5 incline to a great degree outwardly when the front wheels 5 are steered right or left on the kingpins 35, with lower portions of the front wheels 5 slipping to positions under the hood 4 or other parts of the frame 1 and upper portions of the front wheels 5 moving outwardly away from the frame 1. Therefore, the maximum steering angle of front wheels 5 need not be limited to a small value by an interference between the outer ends of connecting rods 49 or the ball joints 50 and the coupling flanges 30 of the front axle case 29 or by an interference between the upper portions and the tractor frame 1. This permits the front wheels 5 to have a great maximum steering angle, and the tractor to have a small minimum turning radius.

Since, as noted above, the front wheels 5 incline to a great degree outwardly when the front wheels 5 are steered right or left on the kingpins 35, the front wheels 5 may be steered by a greater angle than in the prior art by turning the steering wheel 7 in the same amount as in the prior art. This facilitates the steering operation for turning the tractor round. The caster angle β greater than in the prior art also contributes towards avoidance of shimmy.

Reverting to FIG. 5, a planetary reduction mechanism 52 provided between the kingpin 35 and the front wheel hub shaft 38 will be described hereinafter. The bevel gear transmission mechanism 39 includes two bevel gears 53, 54. One of the bevel gears 53 is fixed to a lower portion of kingpin 35, and supported at a boss portion thereof by the movable case 33 through the bearing 36. The other bevel gear 54 is relatively rotatably mounted on the hub shaft 38, and supported by the movable case 33 through a bearing 56. The planetary reduction mechanism 52 comprises a sun gear 58 defined peripherally of a boss portion of the bevel gear 54, a carrier 59 splined to the hub shaft 38, planet gears 61 supported by the carrier 59 through support pins 60, and a ring gear 62 fixedly mounted between a main portion 31a and a cover portion 31b of the transmission case 31, more particularly of the movable case 33.

The boss portion 57 of bevel gear 54 mounted on the hub shaft 38 has a large inside diameter to accommodate a boss portion 63 of carrier 59. The carrier 59 and the boss portion 57 of bevel gear 54 are supported by means of a bearing 64. Number 65 denotes a pressure adjusting bolt. The bolt is provided with an end portion which has the shape of a frustum such that the very end of the bolt has a diametrical cross-section which is smaller than an upper portion. The adjusting bolt 65 has an angularly reduced inner end adjacent bearing 40 so that by screwing in the bolt 65 the diametrical crosssection of the bolt in contact with the bearing 40 becomes greater such that the bearing 40 is pressed in the axial direction whereby pressure of the bearing 40 is adjusted.

In the above construction, the bevel gear 54 mounted on the hub shaft 38 and the boss portion 63 of carrier 59 are in a mutually overlapping relationship, which permits the assembled mechanism to have a small axial length. Since the boss portion 57 of bevel gear 54 has a large inside diameter to receive the boss portion 63 of carrier 59, the boss portion 57 of bevel gear 54 has a large outside diameter also which permits the sun gear 58 to have a large diameter. Thus, each gear of the planetary reduction mechanism 52 may have a correspondingly small width, which is capable of reducing the axial length, resulting in a very compact assembly.

What is claimed is:

1. A steering apparatus for a front wheel drive tractor comprising, at each of opposite lateral sides thereof,
a first front axle,
a front axle case housing said first front axle and defining an upper boundary of a free space in a lower position of the tractor,
a kingpin,
a transmission case provided in an outer end region of said front axle case to accommodate said kingpin, said transmission case including a stationary case connected to said front axle case, and a rotatable case connected to said stationary case to be pivotable about said kingpin, said rotatable case defining a lateral boundary of said free space,
a second front axle attached to said movable case and including means for attaching a rim of a front wheel to said second front axle, said means for attaching said rim to said second front axle lies in a plane along an outer surface of said front wheel, and substantially the length of said kingpin is confined within an inner boundary of said front wheel with a lower end of said kingpin between a center line of said front wheel and an inner boundary of said front wheel,
a first transmission operatively connecting said kingpin to said first front axle, and
a second transmission operatively connecting said second front axle to said kingpin,
wherein said front wheel has a substantially zero camber angle, and said kingpin is inclined such that said movable case is substantially entirely disposed inside an inner boundary of said rim of said front wheel.

2. A steering apparatus as claimed in claim 1 wherein said front wheel has a subtantially zero toe-in.

3. A steering apparatus as claimed in claim 2 wherein said front wheel has a caster angle of approximately 5°.

4. A steering apparatus as claimed in claim 1 wherein said first transmission comprises a bevel gear transmission, and said second transmission comprises a bevel gear transmission and a planetary reduction mechanism.

5. A steering apparatus as claimed in claim 4 wherein said movable case houses said second front axle.

6. A steering apparatus as claimed in claim 5 wherein said second front axle is supported by said movable case.

7. A steering apparatus as claimed in claim 6 wherein said bevel gear transmission includes a bevel gear relatively rotatably mounted on said second front axle, said bevel gear having a boss portion defining a sun gear of said planetary reduction mechanism, and said planetary reduction mechanism includes a carrier having a boss portion disposed adjacent to said boss portion of said bevel gear and fixed to said second front axle.

8. A steering apparatus as claimed in claim 7 wherein said boss portion of said carrier has an end thereof inserted into a recess between said second front axle and an undercut portion of said boss portion of said bevel gear mounted on said second front axle.

9. A steering apparatus as claimed in claim 6, wherein said second front axle is supported by inner and outer bearings and includes means for axially adjusting said outer bearing.

10. A steering apparatus as claimed in claim 1 wherein said kingpin is inclined about 12 degrees.

11. A steering apparatus for a front wheel drive tractor comprising, at each of opposite lateral sides thereof,
a first front axle,
a front axle case housing said first front axle and defining an upper boundary of a free space in a lower position of the tractor,
a kingpin,
a transmission case provided in an outer end region of said front axle case to accommodate said kingpin, said transmission case including a stationary case connected to said front axle case, and a rotatable case connected to said stationary case to be pivotable about said kingpin, said rotatable case defining a lateral boundary of said free space,
a second front axle attached to said movable case and including means for attaching a rim of a front wheel to said second axle, said means for attaching said rim to said second front axle lies in a plane along an outer surface of said front wheel, and substantially the length of said kingpin is confined within an inner boundary of said front wheel with a lower end of said kingpin between a center line of said front wheel and an inner boundary of said front wheel, a first transmission operatively connecting said kingpin to said first front axle, said first transmission comprising a first bevel gear transmission, and a second transmission operatively connecting said second front axle to said kingpin, said second transmission comprising a second bevel gear transmission including a bevel gear mounted on said kingpin and a bevel gear mounted on said second front axle, a planetary reduction mechanism including a carrier fixed to said second front axle, and a sun gear defined on said bevel gear mounted on said second front axle, wherein said front wheel has a substantially zero camber angle, and said kingpin is inclined such that said movable case is substantially entirely disposed inside a boundary of said rim of said front wheel.

* * * * *